United States Patent [19]

Staler

[11] 4,383,211

[45] May 10, 1983

[54] ELECTRICAL CHARGING AND DISCHARGING CONTROL APPARATUS AND METHOD, AND SOLAR TO ELECTRICAL ENERGY CONVERSION APPARATUS INCORPORATING SUCH APPARATUS

[75] Inventor: Terry Staler, Tarzana, Calif.

[73] Assignee: Atlantic Richfield Company, Los Angeles, Calif.

[21] Appl. No.: 222,208

[22] Filed: Jan. 2, 1981

[51] Int. Cl.³ .............................................. H02J 7/32
[52] U.S. Cl. ........................................ 320/9; 320/22; 320/31; 320/39
[58] Field of Search ............. 320/9, 22, 23, 29, 31–33, 320/39, 40

[56] References Cited

U.S. PATENT DOCUMENTS

| | | | |
|---|---|---|---|
| 3,317,809 | 5/1967 | Bowers et al. | 320/30 |
| 3,350,618 | 10/1967 | Barney et al. | 320/5 |
| 3,483,461 | 12/1969 | Schaefer | 320/31 |
| 3,522,507 | 8/1970 | Seiger | 320/31 |
| 3,599,072 | 8/1971 | Becker | 320/31 |
| 3,867,681 | 2/1975 | Bishop et al. | 320/37 |
| 4,237,385 | 12/1980 | Jorgens et al. | 320/13 |
| 4,291,266 | 9/1981 | Portmann | 320/40 |

FOREIGN PATENT DOCUMENTS

| | | | |
|---|---|---|---|
| 2456065 | 6/1975 | Fed. Rep. of Germany | 320/23 |
| 46-41987 | 12/1971 | Japan | 320/39 |
| 614497 | 7/1978 | U.S.S.R. | 323/907 |

Primary Examiner—William H. Beha, Jr.

Attorney, Agent, or Firm—Nilsson, Robbins, Dalgarn, Berliner, Carson & Wurst

[57] ABSTRACT

Electrical charging control apparatus regulates the charging of a rechargeable battery by a solar panel. Selector apparatus can select a direct connection, through a relay, of the output and charging terminal of the solar panel to the output and charging terminal of the battery to permit charging through such a direct connection. It, alternatively, by opening the relay, can select a coupling of such terminals through a regulator, to permit trickle charging through the regulator. Breaker/closer apparatus, during a direct connection, periodically breaks such diret connection so that the selector apparatus can determine whether the signal at the solar panel output and charging terminal, due to the condition of the sun, has gone below the level at which charging can occur. Also, subsequent to a charging termination threshold having been reached and a resulting termination of the direct correction, the breaker/closer apparatus periodically causes such a direct connection so that signal-tester apparatus can again test for the charging termination threshold. Discharging of the battery through loads is terminated by additional breaker apparatus which causes a circuit breaker between the battery and the loads to open when the battery falls below a load disconnect threshold. Any substantial additional discharging through the loads must await the rising of the battery voltage above a load reconnect threshold and a manual closing of the circuit breaker.

23 Claims, 5 Drawing Figures

ELECTRICAL CHARGING AND DISCHARGING CONTROL APPARATUS AND METHOD, AND SOLAR TO ELECTRICAL ENERGY CONVERSION APPARATUS INCORPORATING SUCH APPARATUS

FIELD OF THE INVENTION

This invention pertains to electrical charging and discharging control apparatus and methods, and also, to solar to electrical energy conversion apparatus incorporating such apparatus.

BACKGROUND OF THE INVENTION

Controlling the charging of a rechargeable electrical energy storage device, such as a rechargeable battery, by an electrical energy source, is a requirement that is rather commonly encountered.

The generally favored technique where the signal from the source is subject to substantial variation is the incorporation of a voltage regulator into the control apparatus to lower the voltage of the signal from the source to the approximate level of the fully charged voltage of the device. Then, as the device is charged, the current from the regulator to the device will decrease as the voltage of the device increases, and will be substantially terminated by the matched voltage levels when the device is approximately fully charged. The foregoing technique is, due to the regulation of the voltage level, essentially a constant voltage technique.

A constant current technique, at times, is also used. This technique, by way of example, may be implemented by providing a source with a voltage which is much greater than the fully charged voltage of the storage device. Disadvantages in this technique result from the typical lack of self-regulation and, for some applications, a need to adjust the current to the device at certain stages in the charging process.

In the last few years, with increased experimentation with, and usage of, solar energy, attempts have been made to implement charging control in the context of the charging of an electrical energy storage device, such as a rechargeable battery, by a solar panel. Perhaps the most common implementation provides a regulator to provide essentially a constant voltage, and a self-regulating situation in the charging mode.

Another technique, which has met with some success, and which carries certain advantages, is disclosed in U.S. application Ser. No. 113,936, having John W. Yerkes and Terry Staler as inventors, and Atlantic Richfield Company as assignee, and now abandoned.

As disclosed in such application, that technique entails a direct solar panel to battery connection until a charging termination threshold is reached at the point of such connection, at which time the connection is terminated. Further, during such charging, at certain intervals, breaker apparatus causes a disconnection so that the disconnected solar panel and battery can be tested for whether the ratio of their voltage levels is such that a reconnection should be avoided to prevent discharging of the battery through the solar panel (e.g., at night). Where the charging prevention ratio does not obtain, but due to the charging termination threshold having been reached, the unconnected status does, reconnections, at intervals, occur so that charging can be resumed when such is required.

This is all disclosed in detail in the above-identified application.

According to another basic approach, direct charging through a relay and, at other times, trickle charging through a regulator, is employed. As conventionally proposed and implemented, this variation maintains the direct connection independently of the status of the solar panel, where a charging termination level has not been reached. In addition, once such level has been reached and a direct charging has been terminated, resumption of direct charging typically will not occur until after the disconnected signal at the solar panel has passed below a chosen level (e.g., at night) and, subsequently, passed above that level (e.g., when the sun rises).

The control of discharging of an energy storage device, such as a battery, through a load, in connection with charging control, is also of considerable interest, both generally, and in the context of the charging of a battery by a solar panel. For example, automatic, electronic disconnection of the battery and the load, when the battery voltage passes below a discharge prevention threshold, and automatic electronic reconnection, when the battery voltage passes above a higher load reconnection threshold (after significant recharging), has been employed. In particular, it has been employed in the context of the direct and regulated charging, described in the above paragraph. Such automatic, electronic control is in keeping with the thrust toward fully automatic control.

It might also be noted that in charging and discharging control apparatus, e.g., along the lines described immediately above, transistors and zener diodes are among conventional devices that are commonly used in conventional arrangements.

The present invention incorporates two modes of charging in a context which breaks the coupling for one mode to determine whether the coupling for that mode should be continued or the coupling which permits the other mode should be selected. It further incorporates discharging control in a context which requires manual intervention at a significant juncture. In addition, the charging control is accomplished with the aid of a configuration of a number of electronic devices in a form which provides simplicity of design and operation at the crux of such charging control.

In accordance with the invention, apparatus is provided for controlling the charging of a rechargeable electrical energy storage device for generating a storage device electrical signal, by an electrical energy source for generating a source electrical signal, which source has a charging output terminal and which device has a charging input terminal. Such apparatus, in accordance with the invention, includes: relay means for electrically coupling the charging output terminal of the source and the charging input terminal of the device to permit charging of the device by the source through the relay means; regulator means for electrically coupling the charging output terminal of the source and the charging input terminal of the device to permit charging of the device by the source through the regulator means and for providing an electrical regulated output signal for such charging; signal-testing means coupled to the relay means for receiving the storage device electrical signal and for providing an electrical output signal for terminating such relay means coupling in response to the storage device electrical signal; selector means, coupled to the relay means and responsive to the storage device electrical signal, for receiving the source electrical signal and for providing an electrical selector signal for selecting the relay means coupling to permit charging through the relay means and for selecting the regulator means coupling to permit charging through the regulator means in response to the source electrical signal and the storage device electrical signal; relay breaker means coupled to the relay means for providing an electrical relay breaker signal for breaking such relay means coupling after such coupling for a predetermined period of time; and relay driver means coupled to the relay means for providing an electrical control signal for controlling such relay means coupling in response to the selector signal and the breaker signal.

In accordance with more detailed features, the selector means may include a silicon controlled rectifier operating as a switch, with the gate terminal of the SCR acting as a relay means coupling termination terminal, and with the anode terminal of the SCR acting as a relay means coupling control terminal for initiating such relay means coupling when the source electrical signal passes a predetermined level, for terminating such coupling when the storage device electrical signal passes a predetermined level and for maintaining such coupling during the course of such coupling until the initially described breaking by the breaker signal; the relay breaker means may include an output transistor in parallel with the SCR having an output terminal directly connected to the SCR anode terminal to provide the breaker signal; the relay driver means may include a zener diode in parallel with the SCR, with the signal at the anode of the SCR having to overcome the breakdown voltage of the zener diode to initiate and maintain such relay means coupling; and the selector means may additionally include a resistor having a terminal directly connected to the anode terminal of the SCR, for directly receiving the source electrical signal at the other terminal thereof and for providing a series connection to the anode terminal for the source electrical signal.

In accordance with other more detailed features of the initially described apparatus, the relay means may include a switch for directly connecting the charging input terminal of the storage device and the charging output terminal of the source. Also, the controlling of the relay means coupling may include reestablishing such coupling in response to the selector signal upon the breaking, as initially described, of such coupling.

In accordance with additional aspects of the initially described apparatus, such additional aspects for controlling the discharging of the electrical energy storage device through a load, such apparatus may further include: circuit breaker means for electrically coupling the charging input terminal of the electrical energy storage device to the load to permit such discharging through the load, wherein the circuit breaker means includes an electronically and manually operated switching means; and circuit breaker, breaker means coupled to the circuit breaker means for receiving the storage device electrical signal, for terminating such coupling by the circuit breaker means in response to the level of the device electrical signal falling below a predetermined level and for substantially preventing the reestablishing of such coupling until the level of the device electrical signal rises above a predetermined level and such switching means is manually operated.

In accordance with other aspects of the invention, charging and discharging control apparatus in accordance with the invention may be incorporated into solar to electrical energy conversion apparatus which includes a solar panel as an electrical energy source, and a rechargeable electrical energy storage device which is charged by the solar panel.

Charging control methods, in accordance with the invention, are directed to the methods of operation of the charging and discharging control apparatus, including electronic methods, which can be long-term without human intervention.

DETAILED DESCRIPTION

Figure 1:
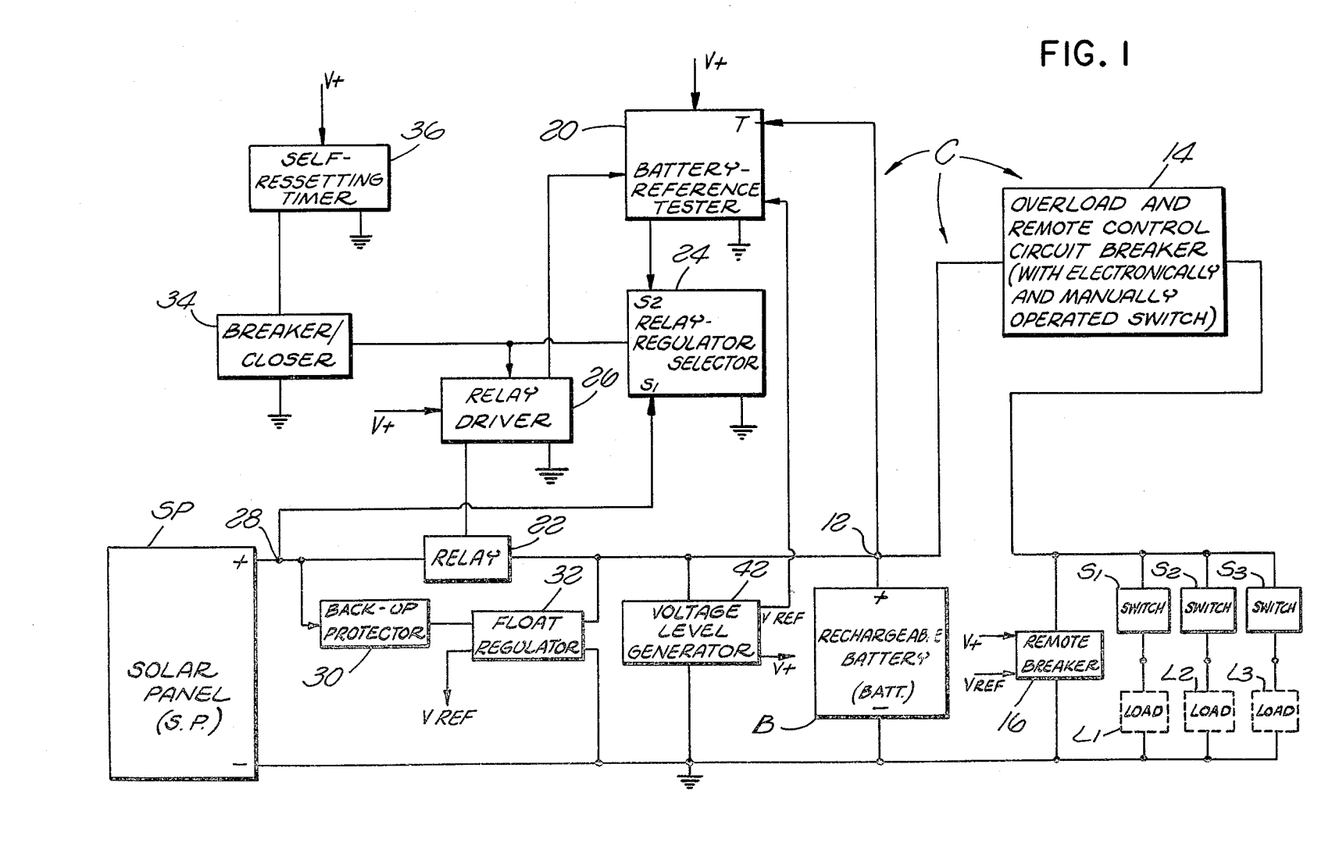
FIG. 1 is a block diagram of solar to electrical energy conversion apparatus in accordance with the invention.

The solar to electrical energy conversion apparatus of FIG. 1, shown with, in phantom, three loads L1, L2 and L3, incorporates the apparatus aspects of the invention and operates in accordance with the method aspects of the invention. Summarily, it incorporates a solar panel SP of a type well-known and commonly used which, under the control of charging and discharging control apparatus C, interacts with a rechargeable battery B to charge the battery when and to the extent the control apparatus C indicates such charging is to occur. In addition, even with three load switches S1, S2 and S3 closed so as to permit current to pass to the loads, the control apparatus, under specific conditions, prevents the discharging of the battery B through such loads.

The battery B is of a type that is well-known, and could well be a common lead-acid (car) battery. The battery, at its output and charging terminal 12, generates, at times in association with the solar panel SP, a battery output signal. Whether this signal is provided to the switches S1, S2 and S3 depends upon whether an overload and remote control circuit breaker 14 is open or closed. The circuit breaker is an overload control device in the sense that it opens as a result of an excess of current passing therethrough. It is a remote control device in the sense that its status is also subject to the control of a remote breaker 16 which is responsive to the level of the output signal of the battery B.

Continuing to initially address the charging and discharging control apparatus C summarily, by testing the voltage level of the battery output signal against the voltage level of a reference electrical signal VREF, a battery-reference tester 20 will cause a relay 22 to open when, during charging, the voltage level of the battery output signal indicates that a chosen charging termination threshold has been reached. This threshold is preferably chosen as the expected voltage at the output and charging terminal 12 of the battery, when the battery is somewhat below being fully charged and the panel is providing a current indicative of early morning or late afternoon sunshine. This, due to the nature of the charging process, will cause such a relay opening, for example during midday sunshine, while the battery is an additional amount below the fully charged level. But in the context of long-term operation, this has been determined to be a convenient and appropriate approach to charging control. The tester 20 accomplishes the opening of the relay through a relay-regulator selector 24, and through a relay driver 26 which controls the opening and closing of the relay. The relay 22 incorporates a switch, which, when closed, directly connects the solar panel output and charging terminal 28 to the output and charging terminal 12 of the battery B. Thus, the relay 22 does not incorporate a device such as a resistor to electrically separate such terminals of the solar panel and rechargeable battery.

When the relay 22 is open, the short circuit of the relay switch across a back-up protector 30 and float regulator 32 is not in effect. In such circumstance, a coupling of the output and charging terminals of the solar panel and battery 28 and 12 through the back-up protector and float regulator is operative. With the output level at the solar panel output and charging terminal 28 sufficiently high, trickle charging can thus occur through the float regulator 32, while the relay 22 is open. The advantage of this over a situation in which there is no regulator coupling is apparent from an understanding of the process of charging a battery. With, in the nature of a high, constant current type of charging, as in the direct connection situation, in order to fully charge the battery, a higher than desirable charging termination threshold would have to be chosen, resulting in the boiling off of electrolyte in order to obtain a full charge. By topping off the charging through a regulator after the charging termination threshold is reached, through, by virtue of the regulator, an essentially constant voltage charging method, a full charge can be obtained without boiling off substantial amounts of electrolyte. Also, in the event of loading, the current through the regulator can supply some of the power to the load that would otherwise come from the battery and represent discharging of the battery.

As already stated, when the charging termination threshold is reached, the battery-reference tester 20 acts through a relay-regulator selector 24 and relay driver 26 to open the relay 22. The selector 24 provides an output signal to the relay driver 26 which causes the driver, while the relay 22 is closed, to maintain the relay in such closed condition. However, during such maintaining, a breaker/closer 34, under the control of a self-resetting timer 36, periodically interacts with the selector 24 and driver 26 to cause an opening of the relay so that the selector can detect the solar panel output signal while it is not coupled through the relay 22 to the battery. When this occurs, the solar panel and battery output signals can differ, and the selector can determine whether the level of the solar panel output signal is such that, to avoid discharging of the battery through the panel, the relay coupling should not be resumed.

Figure 2A:
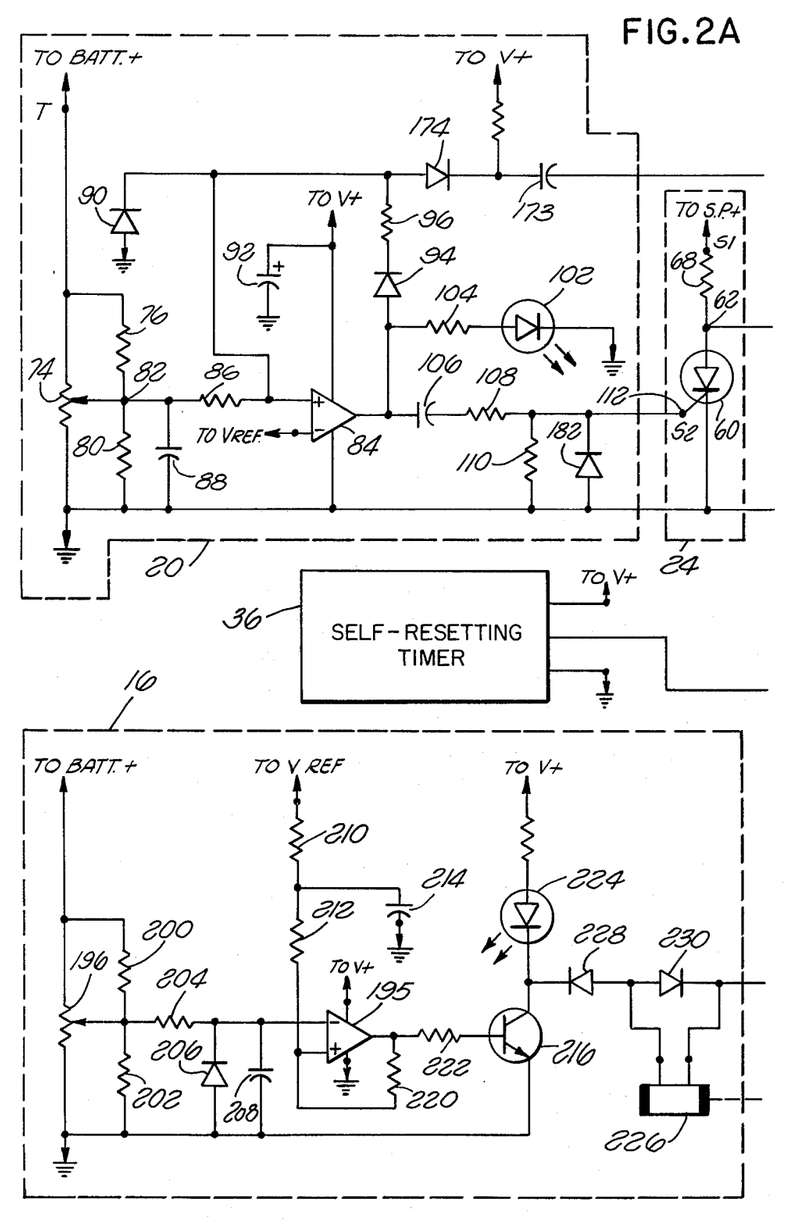
FIGS. 2A to 2C are schematic diagrams of charging and discharging control apparatus incorporated into the conversion apparatus of FIG. 1.
Figure 2B:
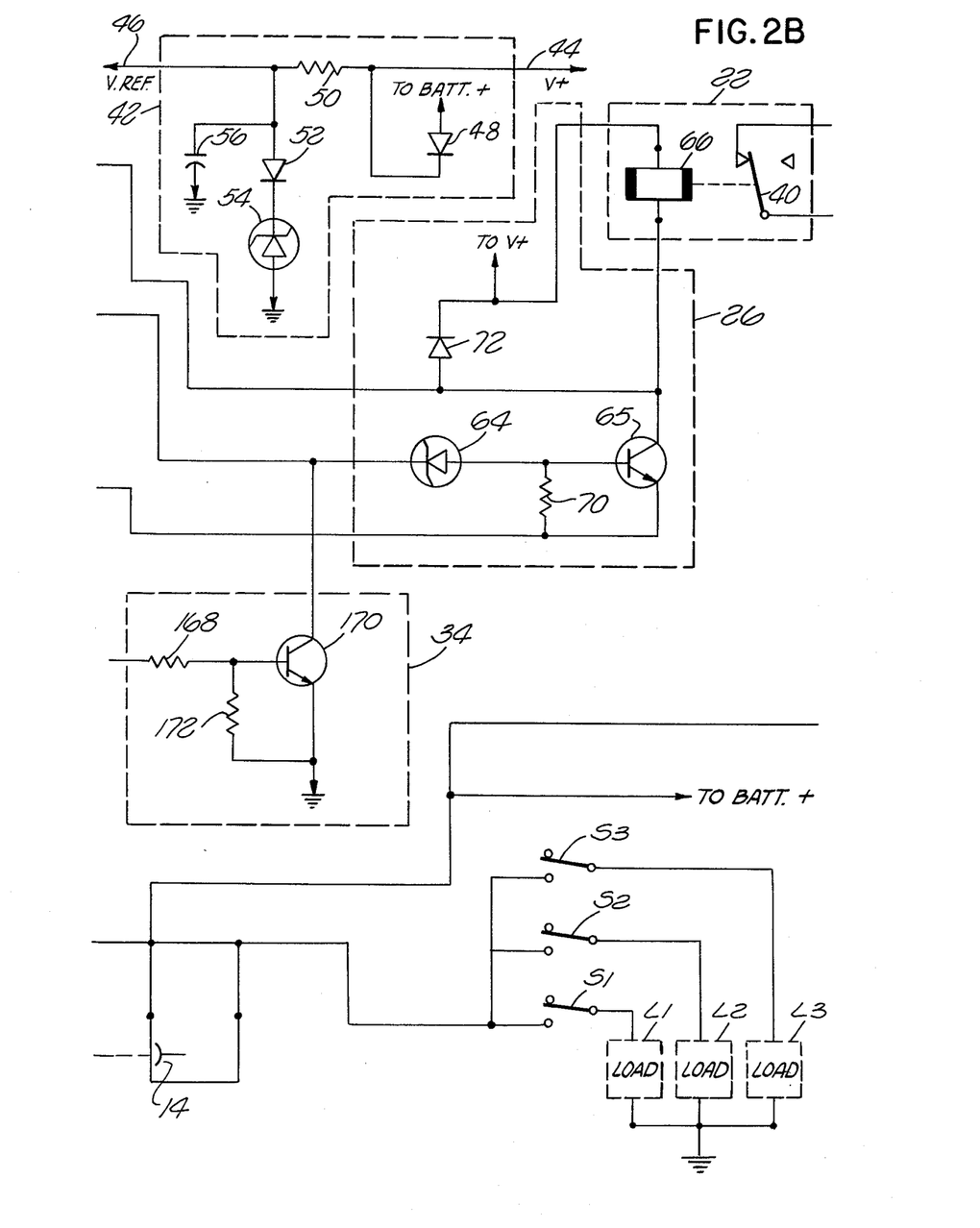
Figure 2C:
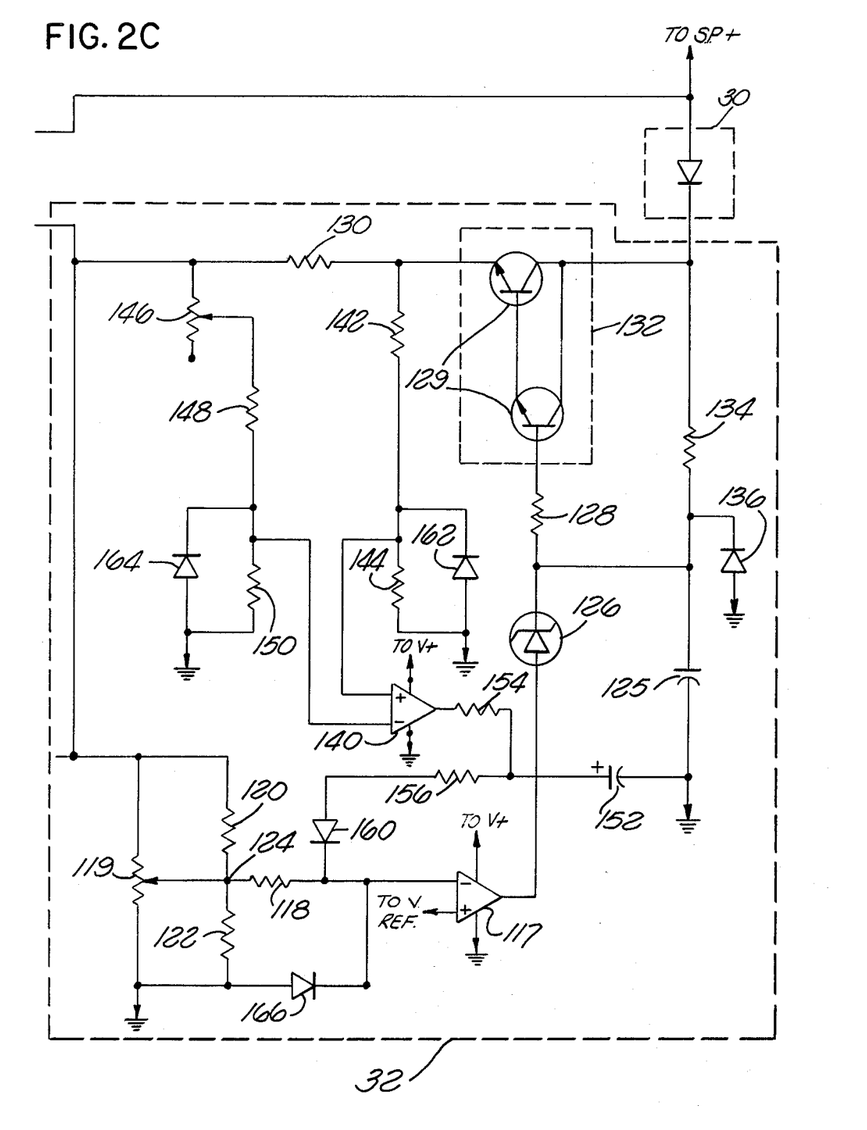

Apparatus in accordance with FIGS. 1 and 2 is conveniently designed so that the level of the solar panel output signal, when the relay coupling to the battery does not obtain, is expected to be sufficient to charge the battery through the relay approximately until night falls, even during extremely overcast weather.

Returning to the above breaking of the relay connection, if the uncoupled solar panel output signal is still above the level at which the relay connection is to obtain, the selector 24 will reestablish the relay coupling.

Along somewhat related lines, while the relay is open, the breaker/closer 34, under the control of the self-resetting timer 36, will, periodically interact with the selector 24 and driver 26 to cause the relay 22 to close. Upon such closing, the battery-reference tester 20 can test the relay-coupled battery output for the charging termination threshold and allow the relay coupling to be maintained while such threshold is not exceeded. Thus, after the charging termination threshold has, at one time been reached, charging can be periodically resumed.

From the foregoing general description, it will be appreciated that the invention embraces the concept of electronic control of the charging process of the battery, without human intervention, in response to the condition of the battery and of the sun.

With regard to the discharging control, in a departure from this concept, electronic control, without human intervention, is not embraced. In particular, the termination of an overload type breaking by the overload and remote circuit breaker 14 requires manual intervention. In addition, even after a breaking caused by the remote breaker 16 detecting that the battery level has fallen below a load disconnect level, and after the battery has substantially risen above a load reconnect level, a reestablishing of the load connection is prevented until there is a manual intervention. This latter requirement for manual intervention is considered to be a significant advantage in that, where humans are not present, and the battery has fallen below the load disconnect level, wasted charging and discharging cycles are avoided.

FIG. 2 shows the design of the charging and discharging control apparatus C in detail. Through it, the operation of the apparatus of FIG. 1, just generally described, may be understood in detail.

Now referring to FIG. 2, as a means for understanding the details of the apparatus, it is convenient to focus on the operation of the apparatus during a sequence of events which might typically occur. This sequence is indicated by the illustrative timing diagrams of FIG. 3. With this established, the complete operation of the apparatus is readily understood.

Therefore, it will initially be assumed that the switch 40 in the relay 22 is closed and the battery is being charged through the switch; that the relay coupled battery output voltage is, in keeping with this, below the charging termination threshold; that, absent the relay coupling, the voltage at the solar panel output and charging terminal 28 (FIG. 1) would be sufficiently high to reestablish the relay coupling, upon a breaking of such coupling; but that the battery output voltage is about to reach the charging termination threshold. Then, after the relay is opened due to the charging termination threshold having been reached, during a period covering several closings of the relay to test the relay coupled battery output voltage, it is assumed that the loads L1, L2 and L3 are not connected by their respective switches S1, S2 and S3, so there is no discharging of the battery. Thus, no significant recharging during this period is required, and relay coupling for any significant period of time is also not required. However, subsequent to the second closing instance, these loads are connected and, prior to the next closing instance, the battery loses substantial energy so as to leave the battery in need of substantial recharging. Thus, upon the third closing instance, the closed status of the relay is maintained. Thus, charging through the relay is resumed. However, before the charging termination threshold again is reached, night falls, and, absent the relay coupling, the voltage at the solar panel output and charging terminal would not cause a resumption of the coupling upon a breaking of the coupling. Night is assumed to fall between a first and second instance of relay opening, so that, upon the second instance, the open status of the relay remains.

Subsequently, during the night, it is assumed that the discharging of the battery is so substantial that the battery output voltage at the battery output and charging terminal falls below the predetermined load disconnect threshold, causing the remote breaker 16 to open the circuit breaker 14. Then, an initial attempt to (manually) reconnect the load is unsuccessful; even though it occurs after day has begun and charging of the battery has been resumed, the charging has not occurred to an extent sufficient to result in a battery output and charging terminal voltage above the predetermined load reconnect threshold (which is above the load disconnect threshold). However, later in the day, after this threshold is passed, an attempt to (manually) reconnect the load is successful.

Diagrams of the output signal of the timer 36, of the battery-reference tester 20, of the relay-regulator selector 24 (the relay-regulator selector signal), and of the output signal of a remote breaker transistor in the remote breaker 16 (the circuit breaker, breaker signal), to illustrate this sequence, are shown in FIGS. 3(a), 3(b), 3(c) and 3(d), respectively. Certain time intervals are exaggerated and certain transitions are sharpened in these figures, in ways which will become apparent, for convenience of description and ease of understanding.

Before proceeding on the above basis, it is convenient to briefly focus on a voltage level generator 42 shown in FIGS. 1 and 2, as this generator provides the power signal V+ over its power line 44 and the reference signal VREF over its reference line 46.

Referring to the voltage level generator, the power signal V+ is a diode voltage drop below the battery output. Thus, a voltage level generator diode 48 is connected between the battery output and charging terminal 12 (FIG. 1) and the power signal line 44. The reference signal is established by driving the current from the voltage level generator diode through a voltage level generator resistor 50, through a second voltage level generator diode 52 and then through a zener diode 54. As shown, the reference voltage is the zener diode breakdown voltage plus the second voltage level generator diode drop. A shunt capacitor 56 is connected across the two diodes to act as a noise filter. The voltage level generator, and the charging and discharging control apparatus, is in the nature of a laod on the battery. However, its power requirements are small compared to the load which the conversion apparatus of FIG. 1 is adapted to handle.

Typically, the panel might provide in the range of 10 amperes in the midday sunshine, with the loading of the apparatus, while loads are connected, being in the range of 5 to 10 amperes, and the battery, assuming it is being charged through the relay, taking any excess. If no load is connected, all the current, of course, would go to the battery. To top off the battery charging, through the float regulator 32, after the charging termination threshold has been reached, an initial trickle current through the regulator of 2 amperes would be typical, decreasing to a maintenance current of in the range of 100 milliamperes after about an hour. The above approximations are for a particular, convenient design. Further in this regard, according to this design, the charging termination threshold is about 15.1 volts for a 12 volt battery (approximate voltage when fully charged and looks into an open circuit) and for a regulated signal level at the output of the regulator (while the solar panel voltage is sufficiently high) of about 14.2 volts. It will be readily apparent that design choices such as the above are readily made in conventional fashion and that the charging and discharging control apparatus may be readily employed with a variety of other design choices.

Now returning to the assumed sequence of events, with the switch 40 closed and the battery output voltage (at the battery output and charging terminal 12) approaching the charging termination threshold, the input voltage from the battery output and charging terminal to the testing input T of the battery-reference tester 20 is increasing. In addition, the voltage from the solar panel output and charging terminal 28 provided to the solar panel input S1 of the relay-regulator selector 24 is the same as the voltage of the battery output and charging terminal 12, as the terminals are directly connected to each other by the switch 40.

In this circumstance, a silicon controlled recitifier 60, in the selector 24, which acts essentially as a switch, is in its open state and the voltage at the anode terminal 62 of the SCR is sufficiently high to overcome the breakdown voltage of a relay driver zener diode 64 and to maintain a relay driver transistor 65 in its ON condition. As a result, the collector current into the transistor, through the relay coil 66, causes the switch 40 to be maintained in its closed state. A relay driver diode 72 is in parallel with the relay coil 66 to protect the relay driver transistor during turn-off of the transistor. A separation resistor 68 separates the solar panel input from the anode terminal 62 of the SCR; also a base-to-emitter resistor 70 is connected across the base and emitter terminals of the relay driver transistor 65 in conventional fashion.

A relay driver zener diode 64 having a breakdown voltage of approximately 8.2 volts has been determined to be a convenient and appropriate choice, with the other exemplary design choices noted above, particularly where it is desired to have the selector 24 generally differentiate only between night and day. In accordance with this, the solar panel SP would be expected to provide a voltage greater than this 8.2 volts during daylight, even if the weather were highly overcast.

Now addressing the details of the battery-reference tester 20, a ladder potentiometer 74 and an initial 76 and a final 80 ladder resistor together form a voltage divider. With the battery being charged and approaching the charging termination threshold, the voltage at a divider terminal 82 will be less than but approaching VREF, which is provided to the negative input of a tester comparator element 84. The comparator element is an operational amplifier which is connected so as to provide a high V+ output when the voltage at its positive input rises above the voltage at its negative input, and a ground output when the voltage at its positive input falls below the voltage at its negative input, all in conventional fashion. The input resistance from the divider terminal 82 looking toward a comparator positive input resistor 86 is sufficiently high so that the ladder potentiometer and resistors can effectively function as a voltage divider. A shunt capacitor 88 is employed to short out high frequency noise from the divider terminal; and a protector diode 90 is connected between the positive input of the comparator element 84 and ground, to clamp the voltage at such input near ground in the event of a mistaken connection of the negative rather than the positive terminal of the battery to the tester input T of the battery-reference tester. Another, biasing shunt capacitor 92 is connected to the biasing terminal of the comparator element 84, to short out high frequency noise along the V+ biasing signal.

Three elements present at other points in FIG. 2, each identical to the tester comparator element 84 just described, along with such tester comparator element, are provided in a single integrated circuit chip which is designated LM 2902N.

With the voltage at the divider terminal 82 below but approaching VREF, as the battery charges, the output of the comparator element 84 will be low. However, as the voltage at the divider terminal passes VREF, a transition to high occurs. Once begun, this transition is driven by positive feedback from the output of the comparator element through a comparator feedback diode 94 and a comparator feedback resistor 96, which will cause the comparator output to be latched high, independently of the battery voltage. This latched high, drives a tester light-emitting diode (LED) 102 through an LED diode resistor 104. The on, light-emitting state of the diode indicates that charging has been terminated due to the charging termination threshold having been reached.

Figure 3:
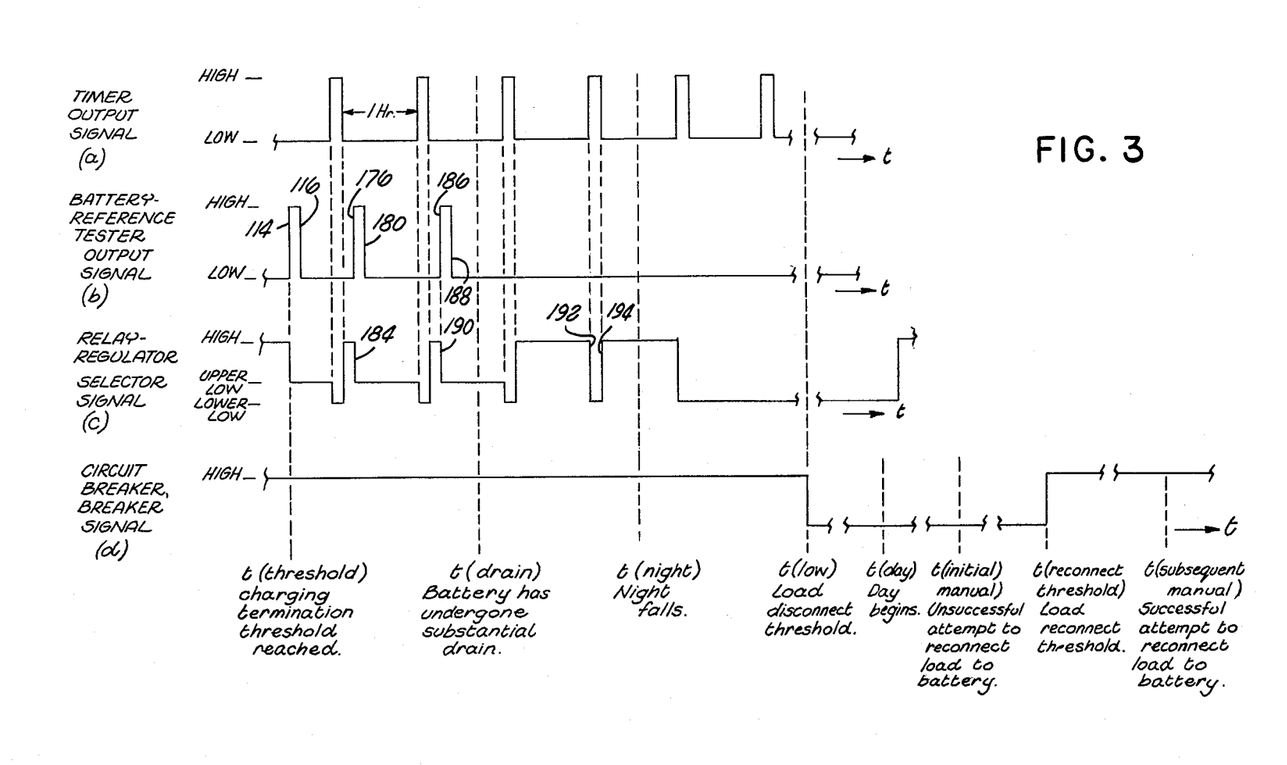
FIG. 3 is an illustrative timing diagram, under an assumed sequence of events, useful in understanding the energy conversion and charging and discharging control apparatus of FIGS. 1 and 2.

This latched high, through a comparator output capacitor 106 and an initial 108 and a final 110 comparator output resistor, causes the voltage at the junction of the output of the tester 20 and gate terminal 112 of the SCR 60 in the selector 24, such junction being the tester input S2 of the SCR, to make a transition to high. This high state, however, due to the blocking action of the output capacitor 106 decays (e.g., in a matter of several seconds or less). This high transition and decay back to low of the battery-reference tester output signal is represented by an initial rising edge 114 and an initial falling edge 116 of the battery-reference tester output signal shown in FIG. 3(b). For convenience of description and ease of understanding, the low to high and subsequent return to low are represented as a sharp high pulse in FIG. 3(b). Also, the relative length of the high state is exaggerated for the same reason.

The simultaneous existence of a high state at the gate terminal 112 and anode terminal 62 of the SCR 60 will cause the SCR to make a transition to its on state. As a result, the voltage at the cathode terminal of the relay driver zener diode 64 is insufficient to overcome the breakdown voltage of the diode and to maintain the relay driver transistor 65 in its on state. Therefore, the relay driver transistor 65 makes a transition to its off state, current through the relay coil 66 is cut off and the switch 40 in the relay 22 opens, thereby disconnecting the battery output and charging terminal 12 from the solar panel output and charging terminal 28. Although, the signal at the gate terminal of the SCR decays back to low, the SCR will remain in its on state until it is deprived of its minimum holding current at its anode terminal.

In the assumed sequence of events, the stage has now been reached where, although the solar panel is providing a signal of sufficient voltage at the solar panel input S1 of the selector 24, to result in a closed relay, the on status of the SCR 60, due to the charging termination threshold of the battery having been reached, maintains the relay in its open state. However, the timer 36 and breaker/closer 34 will periodically deprive the SCR of its holding current so that it returns to its off state and so that the battery, if and while the proper circumstances exist, can again be charged up through the relay 22.

Under the assumed sequence of events, the first two instances of the deprivation of the holding current from the SCR, and resulting therefrom, the first instances of closing of the relay 22, are prior to any substantial discharging of the battery. However, prior to the third instance, there is a substantial discharging, which requires substantial recharging.

Before the above is described in detail, the coupling of the solar panel SP to the battery B through the float regulator 32 should be addressed. Thus, upon the opening of the relay 22, the relay switch 40 no longer shorts out the float regulator 32; therefore, the float regulator coupling of the solar panel and battery becomes operative. For convenience of description and ease of understanding, it will be assumed, along lines addressed above, that the charging termination threshold is 15.1 volts, and that the regulator 32 provides a regulated signal of 14.2 volts given a sufficient solar panel voltage.

Now, with the relay open and the solar panel at a voltage substantially above 14.2 volts, e.g., at a voltage which typically might be in the range of 17 volts, this solar panel voltage at the solar panel output and charging terminal 28 is provided to the back-up protector 30 which, in fact, is a conventional back-up prevention diode. This diode forcloses the possibility of discharging of the battery through the solar panel while the relay 22 is open and the solar panel voltage has fallen below a level which is more than a diode drop above what the battery voltage would be absent any connection to the regulator 32.

It should be noted that upon the relay coupled battery and solar panel reaching the charging termination threshold of 15.1 volts and the opening of the relay, the battery voltage will fall below the regulated level of 14.2 volts due to the absence of the high charging current from the solar panel. Thus, the 14.2 volt level, as already adverted to, is a topping-off level, designed to top-off a charging terminated somewhat below a fully-charged level.

By way of introduction, it should also be noted that the float regulator is designed to provide not only a regulated output voltage, assumed to be 14.2 volts, but to limit the current that can be provided through it to the battery. Along lines noted above, this maximum current will be assumed to be 2 amperes.

A voltage regulator comparator element 117, which as already explained, is essentially identical to the comparator element 84 in the battery-reference tester 20, is at the heart of the voltage regulation. This comparator element is connected with VREF directly provided to its positive input. It is further connected with the battery output voltage being provided to, in effect, a voltage divider which provides the input to a negative input resistor 118 in a similar fashion, with respect to the negative input of this comparator, as is operative at the positive input of the battery-reference comparator element 84. The voltage divider is formed by a ladder potentiometer 119 and initial 120 and final 122 ladder resistors.

Thus, the resistance looking toward the negative input resistor 118 from a divider terminal 124 is sufficiently great to make the voltage divider effective. The voltage division is such that when the battery voltage is 14.2 volts, the voltage at the divider terminal is VREF. Thus, when the battery voltage falls below 14.2 volts, the comparator element 117 goes high to V+, and when the battery rises above 14.2 volts, the output of the comparator element goes low, to ground. A voltage regulation capacitor 125 smooths out these oscillations to establish a substantially DC level at the cathode of a regulator zener diode 126. Then, the time average of the oscillating output of the comparator element, plus the zener diode breakdown voltage, plus a voltage drop across a Darlington Pair input resistor 128, two base-emitter junctions of a high power Darlington Pair of transistors 129 and a current limiter resistor 130, establish the 14.2 volt level. Then, if the regulated voltage level rises slightly above 14.2 volts, the oscillation of the output of the voltage regulator comparator element varies to slightly decrease its time average voltage and bring the regulated voltage back down; and if the regulated voltage falls slightly below 14.2 volts, the oscillation of the output of the comparator element varies to slightly increase its time average voltage and bring the voltage back up.

It should be noted that the Darlington Pair 129 dissipates much of the energy that must be dissipated in carrying out the regulation. Therefore, they are mounted on a heatsink, shown in phantom at 132, which is provided to dissipate the heat they generate. Also, as is apparent from FIG. 2, a charging resistor 134 is connected between the back-up prevention diode 30 and the voltage regulation capacitor 125 to provide a path to both the capacitor 125 and regulator zener diode 126 for current from the solar panel.

In addition, a protector diode 136 will hold the ungrounded terminal of the capacitor 125 and the cathode of the regulator zener diode 126 near ground in the event a substantial, unexpected negative voltage, in the absence of such diode, would otherwise appear thereat.

The current limiter resistor 130 and a current limiter comparator element 140, essentially identical to the other two such elements 84 and 117 already discussed, are at the heart of the current limiting function.

The positive and negative inputs to the current limiter comparator element 140 are taken off a positive input voltage divider and a negative input voltage divider respectively. The positive input voltage divider consists of initial 142 and final 144 ladder resistors; and the negative input voltage divider consists of a ladder potentiometer 146, an initial ladder resistor 148 and a final ladder resistor 150. The ladder resistances are chosen and the potentiometer is adjusted to, under the assumed 2 ampere maximum current, maintain the voltage at the positive and negative inputs of the comparator element equal when the voltage drop across the current limiter resistor 130 is such that the current therethrough and to the battery is 2 amperes. The input resistance looking from the two sides of the current limiter resistor toward the comparator element is sufficiently high that the current from the Darlington Pair 129 is essentially the same as the current into the battery. A 2 ampere voltage of 0.1 volt across the current limiter resistor 130 is a convenient choice.

In a fashion similar to the voltage regulation comparator element 117, the current limiter comparator element 140, though it oscillates between V+ and ground, establishes an average voltage across a comparator output capacitor 152. This is established through a comparator output resistor 154. This voltage level, which can vary slowly in response to variations in the oscillations of the comparator element 140, through a comparator connector resistor 156 and a comparator connector diode 160 affects the voltage at the negative input of the voltage regulation comparator 117. Through this interaction, the current limiter comparator element 140 affects the oscillations of the voltage regulation comparator element 117 and the feedback loop thereof to cause the output of the Darlington Pair 129 to be limited to 2 amperes. If this current is less than 2 amperes, the limiter comparator element 140 will be held at ground and the comparator connector diode 160 will uncouple the two comparator elements. Thus, the current into the battery can fall below 2 amperes, and in fact, is expected to do so as the battery approaches a full charge during a topping off through the float regulator 32. A pair of protector diodes 162 and 164 associated with the positive and negative inputs of the current limiter comparator element 140, and another protector diode 166 associated with the negative input of the voltage regulation comparator element 117, protect these elements against a mistaken connection of the negative battery terminal rather than the positive battery terminal.

Therefore, and now returning to the assumed sequence of events, after the charging termination threshold is reached and the relay 22 opens, the charging process is continued through the float regulator 32. For a typical battery, under the assumed conditions, a typical topping off time of about 1 hour starting with the assumed 2 ampere maximum current and ending with a continuing, approximately 100 milliampere maintenance current, is in the range of what would be expected.

As already noted, however, the timer 36 and breaker/closer 34 interact with the selector 24 and relay driver 26 to provide the opportunity for resumption of the charging through the relay. The timer 36 is a self-resetting timer which provides an output signal to the breaker 34. The timer is normally low; however, at fixed intervals, it makes a transition to high and then, after several seconds, has returned to low. Such operation is conventionally implemented using an EXAR 2242 CP binary counter and apropriate resistors and capacitors, including resistors and capacitors for timing purposes, in association therewith.

Along with the other assumptions made herein for convenience of description and ease of understanding, it will further be assumed that the output signal of the timer goes high every hour. This, and the return to low after several seconds, is shown in FIG. 3(a). The length of the high periods, relative to the low, are exaggerated in this figure for purposes of illustration. The timer operates in the fashion shown in FIG. 3(a) at all times during which the charging and discharging control apparatus has power.

Now referring to the breaker 34, which receives the timer output signal through an input resistor 168 to a breaker transistor 170 which is provided with a base-to-emitter resistor 172, it is evident that the transistor will be on when the timer output signal is high and that it will be off when the timer output signal is low. Thus, the transistor collector, or breaker, signal will, when the breaker transistor 170 is on, control the signal at the point at which the anode of the SCR 60 in the selector 24, the collector of the breaker transistor 170 and the cathode of the relay driver zener diode 64 are connected, and maintain the signal at that point at the small, saturation collector-to-emitter voltage of the transistor when the transistor is on. This will be so even if the SCR 60 is on when the timer output signal goes high, as the forward bias voltage of the SCR is higher than the saturation collector-to-emitter voltage of the transistor.

An SCR designated 2N5060, having a forward biasing voltage of about 1.6 volts, is conveniently used.

Thus, under the assumed sequence of events, as shown in FIG. 3, somewhat less than an hour after the relay 22 opens to terminate the charging of the battery through the relay, the timer output signal goes high for several seconds and the relay-regulator selector signal, at the above-mentioned connection point, falls from an upper low level, the forward bias voltage of the SCR, to a lower low level, the small collector-to-emitter saturation voltage of the breaker transistor 170, for these several seconds. As a result, the SCR is deprived of even its minimal holding current and, immediately after the timer output signal and the breaker signal return to low, again becomes reverse biased. At that point, a high selector signal is reestablished as a result of the solar panel output signal at the solar panel input S1 of the selector 24 and the off state of the SCR. Thus, the relay driver transistor 65 is turned on and the relay again closes. The low, saturation state voltage of the relay driver transistor 65, due to the turning on of such transistor, by a feedback loop to the output of the tester comparator device 84, such loop being formed by a driver feedback capacitor 173, a driver feedback diode 174 and the comparator feedback diode 94 and feedback resistor 96, all in the tester 20, unlatches the output of the tester comparator element 84, causing it to go low, which results in the turning off of the tester LED 102. Thus, the LED no longer indicates that charging through the relay has been terminated due to the charging termination threshold having been reached.

Under the assumed sequence of events, the battery has not undergone any significant discharging since the time when the relay initially opened. Therefore, shortly after the tester comparator element 84 output goes low, a sensing of the charging termination threshold by the tester comparator element 84, will cause the output of the comparator element to latch high again, and to again turn on the tester LED 102. At the tester output (to the gate terminal 112 of the SCR 60), in a repetition of what occurred when the comparator element output previously went high, a transition to high occurs, with a rapid return to low. This is represented along second rising and falling edges 176 and 180 of the illustrative battery-reference tester output signal of FIG. 3(b).

With respect to transitions at the output of the tester comparator element 84, it should be noted that a gate clamping diode 182 in the tester, clamps the battery-reference tester output near ground during an unlatching of the tester comparator element 84 output, to maintain its ("low") status near ground during such an unlatching. However, under the assumed sequence, in accordance with the manner of operation previously explained, the re-latching and resulting short-lived rise at the tester output to the gate terminal 112 of the SCR 60, results in the SCR again becoming forward biased and a return by the relay-regulator selector signal to its upper, low state, with the SCR forward biased. This is illustrated by the second high to upper low, falling edge 184 along the relay-regulator selector signal of FIG. 3(c). Thus, the relay again opens.

One hour later, when the timer output signal again goes high, and at which time the battery still has not undergone any significant discharging, the sequence of events just described is repeated as shown in FIG. 3, including, e.g., third rising and falling edges 186 and 188 along the battery-reference tester output signal and a third high to upper low, falling edge 190 along the relay-regulator selector signal.

Under the assumed sequence of events, prior to the passage of another hour, when the timer output signal again goes high, the battery is assumed to have undergone a substantial energy drain. Thus, this time when the timer output signal goes high, the output signal of the tester comparator element 84 becomes unlatched and remains low, as the charging termination threshold is not in this case detected shortly after the relay closes. As a result, the relay-regulator selector signal remains high, and the relay remains closed to enable the battery to be charged through the relay 22.

One hour later, when the timer output signal again goes high, under the assumption that there is still battery capacity calling for charging through the relay 22, the relay-regulator selector signal is pulled to its lower low level by the output of the breaker transistor 170, opening the relay for a few seconds. But after these few seconds, the high returns due to the solar panel output and the off state of the SCR 60 in the selector 24. This is illustrated, e.g., by a first relay-regulator selector signal high to lower low, falling edge 192 and a fourth relay-regulator selector signal rising edge 194 in FIG. 3(c).

Under the assumed sequence of events, night falls during the course of the next hour. Therefore, although the battery can still take additional charging through the relay 22, the solar panel is not providing the energy required for such charging. This, however, will not be detected at the solar panel selector input S1 until the timer output signal again goes high. This is so because until that time, the output and charging terminal of the battery 12 will be directly connected to the output and charging terminal of the solar panel 28, and the battery, therefore, will maintain the output and charging terminal of the solar panel and the solar panel selector input at a high level. However, when the timer output signal does go high, the relay-regulator selector signal is pulled low by the breaker transistor 170, and the connection through the relay is broken. Thereafter, although the transistor has turned off, there is insufficient voltage at the anode 62 of the SCR 60 to overcome the breakdown voltage of the relay driver zener diode 64. Therefore, the relay remains opens.

As illustrated in FIG. 3, the timer output signal continues to go high every hour during the night, but this has no operational effect, as there is insufficient voltage at the anode 62 of the SCR 60 to close the relay.

To this point, the illustrative sequence of events, and the explanation of the operation of the charging and discharging control apparatus in connection therewith, has provided a detailed understanding of the charging control features and operation of the apparatus of FIGS. 1 and 2. Thus, the charging control features and operation provide for direct charging through a relay and also for charging through a regulator. Further, when the coupling through the relay is not operative, but the solar panel voltage is sufficient to charge the battery through the relay, a periodic resumption of such coupling is provided for. In addition, when the coupling through the relay is operative, a periodic breaking of such coupling is provided to determine whether the state of the sun is such that such coupling is no longer called for. Finally, while coupling through the relay exists, testing continuously occurs for a charging termination threshold at which charging through the relay is to be terminated.

The remote breaker 16 and the overload and remote control circuit breaker 14 are the elements of the charging and discharging control apparatus which control the discharging of the battery through the loads L1, L2 and L3 when the manually operated switches S1, S2 and S3 associated with the loads are closed.

Referring to the remote breaker 16, it incorporates a remote breaker comparator element 195, identical to the three other comparator elements already addressed, which at its negative input, receives a voltage determined by the battery voltage. A voltage divider ladder, including a potentiometer 196, and initial and final ladder resistors 200 and 202, in connection with a negative input resistor 204, operates in the conventional manner already described in connection with other voltage divider ladders herein. A protector diode 206 protects the comparator element against a mistaken connection of the negative, rather than the positive, battery terminal, and a shunt capacitor 208 shunts out high frequency noise.

The voltage VREF is established at the positive input of the remote breaker comparator element 195 through initial and final positive input resistors 210 and 212. A turn-on capacitor 214, in a shunt connection between the two resistors, assures that, independently of the battery voltage, at least for a short interval of time after power-up (connection of the battery), the output of the comparator element 195 will be low. For convenience of description and ease of understanding, it will be assumed that, along with the other assumptions previously made for the same purpose, with respect to the discharging control of the apparatus of FIGS. 1 and 2, a load disconnect threshold of 12.0 volts and a load reconnect threshold of 14.1 volts, for the battery voltage, has been selected. Thus, significant hysterises is built into the discharging control aspect of the apparatus.

In accordance with this, and continuing with the illustrative sequence of FIG. 3, the voltage of the battery, at the beginning of the sequence, is above the load disconnect threshold and, during the sequence, remains above this level until sometime after night falls. As shown in FIG. 3(d), a circuit breaker, signal at the collector of a remote breaker transistor 216, then, remains high until the battery output falls below the load disconnect threshold, at which time this circuit breaker, breaker signal goes low. As shown in FIG. 2, the remote breaker comparator element 195 is provided with a feedback resistor 220 to establish the hysterises of the remote breaker 16; and the remote breaker transistor 216 is conventionally provided with an input resistor 222.

When the circuit breaker, breaker signal goes low, a remote breaker light-emitting diode 224 turns on to indicate the occurrence of a load disconnect due to the battery voltage falling below the load disconnect threshold. The disconnect occurs because the low circuit breaker, breaker signal pulls a substantial current from the battery through a remote breaker coil 226, which causes the overload and remote control circuit breaker to open. This of course is the remote control aspect of the circuit breaker 14. When the circuit breaker, breaker signal is high, the current through the remote breaker coil 226 is insufficient to open the circuit breaker 14.

With respect to the overload aspect of the circuit breaker 14, if an excess amount of current is sensed going through the circuit breaker to the load, the circuit breaker will also open. A typical current level to cause an overload breaking might be 15 amperes.

As is apparent by reference to FIG. 2, upon the opening of the circuit breaker due to the battery output having fallen below the load disconnect threshold, the remote breaker coil 226 will be deprived of current. However, the circuit breaker 14 once it is opened, whether due to a current overload or to the battery voltage falling below the load disconnect threshold, remains open in the absence of human intervention. Thus, it has a toggle lever; and when either a current overload occurs or the battery output voltage falls below the load disconnect threshold, as an automatic, electronic breaking occurs, the toggle lever also is automatically, electronically flipped. Then the circuit breaker can only be reclosed by manual operation of the toggle lever. Upon such a manual intervention, if, e.g., a current overload condition remains, the connection by the circuit breaker, after being completed for an instant, will again automatically, electronically break, even if the toggle lever is held in the closed position. Further, the toggle lever, in such a held situation in which the overload situation had remained, will return to the open position when the intervening person lets go of the lever, whether or not the overload situation still exists when the person lets go. In summary, with respect to a current overload situation, a manual flipping of the lever from open to closed is required after the overload situation ceases, to achieve a desired closing of the breaker.

Similarly, if the circuit breaker 14 has opened and the toggle lever has flipped due to the battery voltage having fallen below the load disconnect threshold, and an attempt is made to manually operate the toggle lever when the battery has not recharged above the load reconnect threshold, current may pass through the load for a very short time before the automatic re-opening of the circuit breaker occurs. Again, holding the lever will have no effect, even if the load reconnect threshold is passed while the lever is being held; and in such a held situation in which the load reconnect threshold had not been passed, the lever will flip back when the intervening person lets go. In summary, with respect to a low voltage disconnect situation, a manual flipping of the lever from open to closed is required after the load reconnect threshold is passed, to accomplish a desired closing of the breaker.

Thus, in accordance with the above, the reconnection of the load is substantially prevented until, in one case, the current overload situation no longer exists and a manual intervention occurs and, in the other case, until the load reconnect threshold has been exceeded and a manual intervention occurs. It might be noted that after an overload breaking, during an unsuccessful, attempted reconnection, due to the drawing of a large, overload current by the load for a short period of time, the battery voltage could conceivably fall below the load disconnect threshold. Therefore, a breaking of the circuit breaker due to substantial discharging of the battery and the resulting transition to low at the collector of the remote breaker transistor 216, could occur as a result of an unsuccessful, attempted reconnection.

The overload and remote control circuit breaker 14 with toggle lever, and the remote breaker coil 226 associated therewith, are found, e.g., in a device sold by Heinemann and designated JA1-B16-A-15-3-DUCON-12VDC. The particularly designated device, with the DUCON standing for dual control, and with the 12VDC meaning 12 volts DC (for the remote breaker coil), is conveniently used for the conditions and circumstances which have been specified by way of illustration herein.

Still referring to the discharging control and FIG. 2, a blocking diode 228 is connected in the path between the collector of the remote breaker transistor 216 and the load switches S1, S2 and S3. This is to block the collector from a path to ground through such a closed switch and its associated load, in the event of an automatic overload, or a manual (through the toggle switch), opening of the circuit breaker 14. Otherwise the remote breaker LED 216 could go on upon an opening. Also, the remote breaker coils 226 is provided with a shunt diode 230 to protect the remote breaker transistor 216 upon a termination of the substantial current through the coil which is required to cause the coil to open the circuit breaker 14.

With this background as to the discharging control, the illustrative circuit breaker, breaker signal at the collector of the remote breaker transistor 216 can now be understood beyond its transition to low when the battery voltage falls below the load disconnect threshold. Thus, after day begins, and at the time of an attempt to initially manually close the circuit breaker 14, the battery is below the load reconnect threshold, the circuit breaker signal is still low, and the reconnection attempt is unsuccessful. However, subsequently the load reconnect threshold is exceeded due to charging of the battery, and this breaker signal goes high, turning off the remote breaker LED 224. Then, a subsequent attempt to manually close the circuit breaker 14 is successful and the battery can again supply current to drive the loads.

It will be appreciated that many changes and variations may be made in the described embodiment of solar to electrical energy conversion apparatus, including the charging and discharging control apparatus therein, without departing from the spirit and scope of the invention.

What is claimed is:

1. Apparatus for controlling the charging of a rechargeable electrical energy storage device for generating a storage device electrical signal, by an electrical energy source for generating a source electrical signal, said source having a charging output terminal and said device having a charging input terminal, said apparatus including:

relay means for electrically coupling the charging output terminal of the source and the charging input terminal of the device to permit said charging through said relay means;

regulator means for electrically coupling the charging output terminal of the source and the charging input terminal of the device to permit said charging through said regulator means and for providing an electrical regulated output signal for said charging;

signal-testing means coupled to said relay means for receiving the storage device electrical signal and for providing an electrical output signal for terminating said coupling by said relay means in response to the storage device electrical signal;

selector means, coupled to said relay means and responsive to the storage device electrical signal, for receiving the source electrical signal and for providing an electrical selector signal for selecting said relay means coupling to permit said charging through said relay means and for selecting said regulator means coupling to permit said charging through said regulator means in response to the source electrical signal and the storage device electrical signal;

relay breaker means coupled to said relay means for providing an electrical relay breaker signal for breaking said coupling by said relay means after said coupling by said relay means for a predetermined period of time; and relay driver means coupled to said relay means for providing an electrical control signal for controlling said coupling by said relay means in response to said selector signal and said breaker signal.

2. Charging control apparatus as defined in claim 1 wherein said controlling of said coupling by said relay means includes reestablishing said coupling in response to said selector signal upon said breaking.

3. Charging control apparatus as defined in claim 1 for controlling the discharging of the energy storage device through a load, further comprising:

circuit breaker means for electrically coupling the charging input terminal of the electrical energy storage device to the load to permit said discharging of the electrical energy storage device through the load, said circuit breaker means including an electronically and manually operated switching means;

circuit breaker, breaker means coupled to said circuit breaker means for receiving the storage device electrical signal, for terminating said coupling by said circuit breaker means in response to the level of the device electrical signal falling below a predetermined level and for substantially preventing the reestablishing of said coupling until the level of the device electrical signal rises above a predetermined level and said switching means is manually operated.

4. Charging control apparatus as defined in claim 1 wherein said selector means comprises selector switching means having a relay means coupling termination terminal, a relay means coupling control terminal and a third terminal, said switching means being connected to provide an electrical switching signal at said control terminal for initiating said coupling by said relay means when the source electrical signal passes a predetermined level, for terminating said coupling by said relay means when said storage device electrical signal passes a predetermined level and for maintaining said coupling by said relay means during said coupling until said breaking by said breaker signal.

5. Charging control apparatus as defined in claim 4 wherein said selector switching means comprises an SCR, said termination terminal being the gate terminal of said SCR and said control terminal being the anode terminal of said SCR.

6. Charging control apparatus as defined in claim 5 wherein said relay breaker means comprises an output transistor in parallel with said SCR having an output terminal directly connected to said SCR anode terminal to provide said breaker signal.

7. Charging control apparatus as defined in claim 6 wherein said relay driver means comprises a zener diode in parallel with said SCR and wherein said switching signal at said anode terminal must overcome the breakdown voltage of said zener diode to initiate and to maintain said relay means coupling.

8. Charging control apparatus as defined in claim 6 wherein said selector means further comprises a resistor having a terminal directly connected to said anode terminal, for directly receiving said source electrical signal at the other terminal and for providing a series connection to said anode for said signal.

9. Charging control apparatus as defined in claim 8 wherein said relay driver means comprises a zener diode in parallel with said SCR and wherein said switching signal at said anode terminal must overcome the breakdown voltage of said zener diode to initiate and to maintain said relay means coupling.

10. Charging control apparatus as defined in claim 1 wherein said relay means includes a switch for directly connecting the charging input terminal of the storage device and the charging output terminal of the source.

11. Solar to electrical energy conversion apparatus, comprising:
a solar panel for receiving and converting solar energy to electrical energy, and for generating a solar panel electrical signal in response to said solar energy, said solar panel having a charging output terminal;
a rechargeable electrical energy storage device for generating a storage device electrical signal, said storage device having a charging input terminal;
relay means for electrically coupling said charging output terminal of said solar panel and said charging input terminal of said storage device to permit said solar panel to charge said storage device through said relay means;
regulator means for electrically coupling said charging output terminal of said solar panel and said charging input terminal of said storage device to permit said solar panel to charge said storage device through said regulator means and for providing an electrical regulated output signal for said charging;
signal-testing means coupled to said relay means for receiving said storage device electrical signal and for providing an electrical output signal for terminating said coupling by said relay means in response to said storage device electrical signal;
selector means, coupled to said relay means and responsive to said storage device electrical signal, for receiving said solar panel electrical signal and for providing an electrical selector signal for selecting said relay means coupling to permit said charging through said relay means and for selecting said regulator means coupling to permit said charging through said regulator means in response to said solar panel electrical signal and said storage drive electrical signal;
relay breaker means coupled to said relay means for providing an electrical relay breaker signal for breaking said coupling by said relay means after a predetermined time; and
relay driver means coupled to said relay means for providing an electrical control signal for controlling said coupling by said relay means in response to said selector signal and said breaker signal.

12. Solar to electrical energy conversion apparatus as defined in claim 11 wherein said controlling of said coupling by said relay means includes reestablishing said coupling in response to said detector signal upon said breaking.

13. Solar to electrical energy conversion apparatus as defined in claim 11 for controlling the discharging of said energy storage device through a load, further comprising:
circuit breaker means for electrically coupling said charging input terminal of said electrical energy storage device to the load to permit said discharging of said electrical energy storage device through the load, said circuit breaker means including an electronically and manually operated switching means;
circuit breaker, breaker means coupled to said circuit breaker means for receiving said storage device electrical signal, for terminating said coupling by said circuit breaker means in response to the level of said device electrical signal falling below a predetermined level and for substantially preventing the reestablishing of said coupling until the level of said device electrical signal rises above a predetermined level and said switching means is manually operated.

14. Solar to electrical energy conversion apparatus as defined in claim 11 wherein said selector means comprises selector switching means having a relay means coupling termination terminal, a relay means coupling control terminal and a third terminal, said switching means being connected to provide an electrical switching signal at said control terminal for initiating said coupling by said relay means when said source electrical signal passes a predetermined level, for terminating said coupling by said relay means when said storage device electrical signal passes a predetermined level and for maintaining said coupling by said relay means during said coupling until said breaking by said breaker signal.

15. Solar to electrical energy conversion apparatus as defined in claim 14 wherein said selector switching means comprises an SCR, said termination terminal being the gate terminal of said SCR and said control terminal being the anode terminal of said SCR.

16. Solar to electrical energy conversion apparatus as defined in claim 11 wherein said relay means includes a switch for directly connecting said charging input terminal of said storage device and said charging output terminal of said solar panel.

17. Solar to electrical energy conversion apparatus as defined in claim 11 wherein:
said solar panel charging output terminal is connected to provide said solar panel electrical signal;
said storage device charging input terminal is connected to provide said storage device electrical signal;
said signal-testing means is connected to receive said storage device electrical signal at said storage device charging input terminal; and
said selector means is connected to receive said solar panel electrical signal at said solar panel charging output terminal.

18. A method of controlling the charging of an electrical energy storage device for generating a storage device electrical signal, by an electrical energy source for generating a source electrical signal, said source having a charging output terminal and said device having a charging input terminal, said method comprising the steps of:
generating an electrical selector signal responsive to the source and device electrical signals;
electrically coupling the charging output terminal of the source and the charging input terminal of the device through a relay to permit said charging through said relay;
maintaining said coupling through said relay to permit said charging through said relay, in response to said selector signal;
generating an electrical breaker signal responsive to said maintaining of said coupling for a predetermined period of time;

breaking said coupling after said maintaining of said coupling for a predetermined period of time, in response to said breaker signal;

electrically coupling the charging output terminal of the source and the charging input terminal of the device through a signal regulator to permit said charging through said signal regulator;

maintaining said coupling through said signal regulator to permit said charging through said regulator, in response to said selector signal;

reestablishing said coupling through said relay to permit said charging through said relay;

generating an electrical tester signal responsive to the device electrical signal;

terminating an electrical coupling through said relay to permit said charging through said relay, in response to said tester signal.

19. The charging control method as defined in claim 18 wherein said coupling through said relay, said maintaining of said coupling through said relay, said breaking, said coupling through said regulator, said maintaining of said coupling through said regulator, said reestablishing, and said terminating, steps occur electronically, without human intervention.

20. The charging control method as defined in claim 19 for controlling the discharging of the electrical energy storage device through a load, including the additional steps of:

electrically coupling the charging input terminal of the electrical energy storage device to the load through an electronically and manually operable switch to permit said discharging of the electrical energy storage device through the load;

terminating said coupling of the charging input terminal of the electrical energy storage device to the load in response to the level of the device electrical signal falling below a predetermined level; and substantially preventing the reestablishing of said coupling until the level of the device electrical signal rises above a predetermined level and said switch is manually operated.

21. The charging and discharging control method as defined in claim 20 wherein said terminating of said coupling of the charging input terminal of the electrical energy storage device to the load occurs electronically, without human intervention.

22. The charging control method as defined in claim 18 for controlling the discharging of the energy storage device through a load, including the additional steps of:

electrically coupling the charging input terminal of the electrical energy storage device to the load through an electronically and manually operable switch to permit said discharging of the electrical energy storage device through the load;

terminating said coupling of the charging input terminal of the electrical energy storage device to the load, in response to the level of the device electrical signal falling below a predetermined level; and substantially preventing the reestablishing of said coupling until the level of the device electrical signal rises above a predetermined level and said switch is manually operated.

23. The charging control method as defined in claim 18 wherein said coupling through said relay step includes directly connecting the charging output terminal of the electrical energy source and the charging input terminal of the electrical energy storage device.

* * * * *